United States Patent [19]

Khoe

[11] 4,440,470

[45] Apr. 3, 1984

[54] OPTICAL TRANSMISSION SYSTEM COUPLING A SEMICONDUCTOR LASER DIODE TO A MULTIMODE OPTICAL FIBER

[75] Inventor: Giok D. Khoe, Eindhoven, Netherlands

[73] Assignee: U.S. Philips Corporation, New York, N.Y.

[21] Appl. No.: 293,756

[22] Filed: Aug. 17, 1981

[30] Foreign Application Priority Data

Sep. 12, 1980 [NL] Netherlands .......................... 8005134

[51] Int. Cl.³ ............................................... G02B 7/26
[52] U.S. Cl. .............................. 350/96.20; 350/96.18; 357/17
[58] Field of Search ............... 350/96.15, 96.16, 96.18, 350/96.20, 96.21; 250/552, 227; 357/17, 19

[56] References Cited

U.S. PATENT DOCUMENTS

| | | | |
|---|---|---|---|
| 4,076,375 | 2/1978 | Muska et al. | 350/96.15 |
| 4,169,656 | 10/1979 | Hodge | 350/96.15 |
| 4,199,222 | 4/1980 | Ikushima et al. | 350/96.18 X |
| 4,201,447 | 5/1980 | Thompson et al. | 350/96.15 X |
| 4,327,963 | 5/1982 | Khoe et al. | 350/96.18 |

FOREIGN PATENT DOCUMENTS 55-113008 9/1980 Japan .

OTHER PUBLICATIONS

T. G. Giallorenzi, "Optical Communications Research & Technology: Fiber Optics," IEEE, vol. 66, No. 7, Jul. 1978, p. 746.
R. E. Epworth, "The Phenomenon of Modal Noise in Analogue and Digital Optical Fibre Systems," Proc. Fourth Eur. Conf. on Optical Comm., Sep. 12-15, 1978, pp. 492-501.
Y. Hirose et al., "Model for Return-Beam-Induced Noise Generation in GaAlAs Semiconductor Lasers," Electronic Lett., vol. 16, No. 6, 1980, pp. 202-204.

Primary Examiner—John D. Lee
Attorney, Agent, or Firm—Marc D. Schechter

[57] ABSTRACT

Optical transmission system comprising a laser diode which is coupled to a transmission fiber via a coupling path. The coupling path includes a monomode fiber or the series arrangement of a monomode fiber and a plurality of multimode fiber lengths, the cross-section of which, seen from the laser, increase in size. As a result thereof the modal noise and the reflection noise in the optical system in drastically reduced.

6 Claims, 3 Drawing Figures

OPTICAL TRANSMISSION SYSTEM COUPLING A SEMICONDUCTOR LASER DIODE TO A MULTIMODE OPTICAL FIBER

BACKGROUND OF THE INVENTION

The invention relates to an optical transmission system comprising a semiconductor laser diode which is coupled to a multimode transmission fiber via a coupling path.

When high quality laser diodes are combined in an optical transmission system with multimode fibers, modal noise is a very serious problem. This problem is particularly annoying in transmission systems using analog modulation. The large coherence length of these laser diodes creates in the transmission fiber, at large distances from the laser, time-varying intensity distributions across the fiber cross-section which may cause intensity modulation of the optical signal behind a nonideal coupling. Because of their shape these intensity distributions are called speckle patterns, as described in, for example, the article entitled "The Phenomenon of Modal Noise In Analogue and Digital Optical Fibre Systems" by R. E. Epworth. (Proceedings of the Fourth European Conference on Optical Communication, Sept. 12-15, 1978, Genoa, pages 492-501).

In addition, reflection noise is a problem in an optical transmission system. This type of noise is the result of a nonideal coupling which reflects a portion of the intensity-varying light and returns it into the laser diode. The varying, reflected light which reaches the laser may be coupled into the fiber to greater extent by the active medium of the laser, and it can consequently considerably disturb the originally desired optical signal. This problem is described in, for example, the article entitled "Model For Return-Beam-Induced Noise Generation In GaAlAs Semiconductor Lasers" by Y. Hirose et al (Electronics Letters, Mar. 13th, 1980, Volume 16, No. 6, pages 202-204.

SUMMARY OF THE INVENTION

It is an object of the invention to provide a solution by means of which the modal noise and the reflection noise in an optical transmission system is reduced. According to the invention, these noise sources are reduced by coupling a laser diode to a multimode fiber by at least a monomode fiber.

In a preferred embodiment the coupling path is formed by the series arrangement of a monomode fiber and one or more lengths of multimode fiber. The numerical aperture on the optical axis, and the core diameter of the multimode fibers, seen from the semiconductor laser diode, increase in size. The numerical aperture on the optical axis and the core diameter of the last fiber in the coupling path are smaller than the numerical aperture on the optical axis and the core diameter of the transmission fiber. Preferably, the length of the coupling path is larger than the coherence length of the semiconductor laser diode.

DESCRIPTION OF THE PREFERRED EMBODIMENTS

Figure 1:
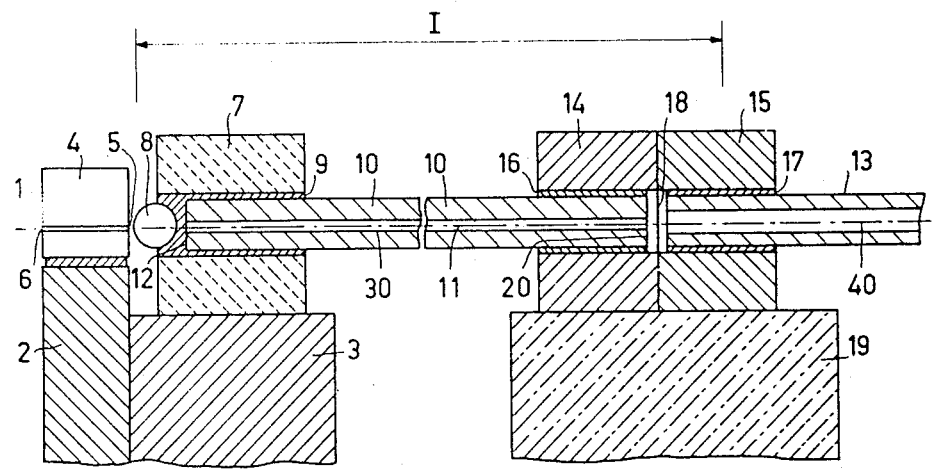
FIG. 1 is a schematic, cross-sectional view through an optical transmission system according to the invention.

In the embodiment shown in FIG. 1, a semiconductor diode of the multilayer type is mounted on a heat sink 2, which is fitted in a holder 3. The active layer 4 forms the laser resonator in combination with the two reflecting end faces 5 and 6. The end faces are semi-transparent mirrors which pass a portion of the incident light. The light passed by the end face 5 is coupled via the coupling path I to the core 40 of the transmission fiber 13. Fiber 13 forms the beginning of a long-distance transmission system.

The coupling path I comprises a lens 8 and a monomode fiber 10. Lens 8 and fiber 10 are centered on an optical axis 11 by forming a capillary cavity in a holder 7. Fiber 10 is inserted into holder 7 from one side, and the lens 8 is inserted into holder 7 from the other side. Because of the convexity of the lens 8, no further orientation of the lens 8 with respect to the fiber 10 is required. A transparent coupling material 9 is provided between the lens 8 and the fiber 10 in order to prevent reflections at the surfaces of the lens and fiber. Preferably, the refractive index of the coupling material 9 has the same value as the refractive index of the center of the fiber 10.

At its output surface 20, the monomode fiber 10 is coupled to the input surface area of a multimode transmission fiber 13. Fibers 10 and 13 are centered on the optical axis 11. A capillary cavity in which the fiber 10 is cemented by means of a coupling material 16 is formed in a holder 14. A capillary cavity in which the transmission fiber 13 is cemented by means of a coupling material 17 is formed in a holder 15. The two holders 14 and 15 are provided on a common support 19. The support 19 may have been provided with, for example, a V-shaped slot in which two cylindrical holders 14 and 15 are secured, as described in, for example, U.S. Pat. No. 4,327,963 (Netherlands Patent Application No. 7,605,819). The holders 14 and 15 are closed with a transparent cover, preferably in the region of the plane 18. If so desired, these covers may be provided with an antireflection layer.

In the operation of an optical transmission system according to the invention, the light emitted by the laser 1 from the end face 5 is radiated into the monomode fiber 10 via the lens 8. The lens 8 converts the diverging light from the laser 1 into a beam of substantially parallel light rays, as a result of which the coupling efficiency between the laser 1 and the monomode fiber 10 is increased. The length of the monomode fiber 10 is chosen at least equal to the coherence length of the laser 1. Herein, the coherence length is understood to mean the product of the coherence period and the propagation velocity in the fiber 10. The coherence period is the time up to which a light wave may be delayed so that it still just interferes with the undelayed lightwave. Consequently, no interference will occur between two light waves when the difference between the time delays of the two light waves exceeds the coherence period. This notion will be further explained with reference to FIG. 2.

Figure 2:
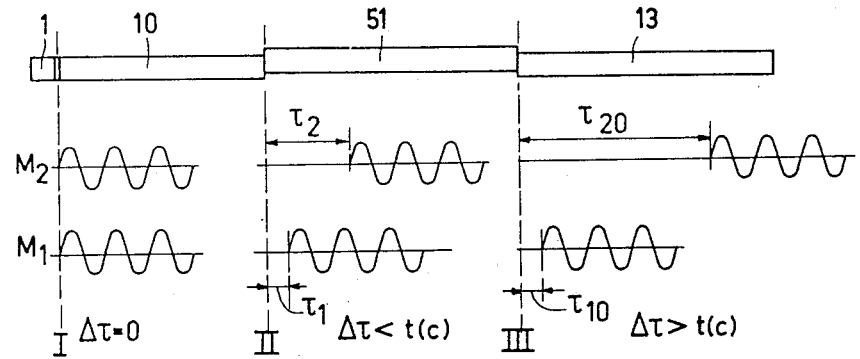
FIG. 2 is a schematic illustration of the operation of the system according to the invention.

In FIG. 2, reference numeral 1 denotes a laser diode. The multimode fiber 10 is incorrectly coupled to the multimode fiber 51 in the region of the sectional line II.

The multimode fiber 51 is incorrectly coupled to the multimode fiber 13 in the region of the sectional line III. Let it be assumed that in the region of the sectional line I two propagation modes $M_1$ and $M_2$ are transmitted by the laser 1. Both modes are perfectly coherent, since there is no difference in time delay between the two modes. The light now propagates in the fiber 10 to the sectional plane II, the mode $M_1$ being delayed by $\tau_1$ and the mode $M_2$ by $\tau_2$. The difference in time delays of the modes $M_1$ and $M_2$ is smaller than the coherence period $t(c)$ of the laser 1. Because of the nonideal coupling between the fibers 10 and 51, interference will now occur between the two modes, which results in the occurrence of the above-mentioned modal noise.

The light now propagates further in the fiber 51 to the sectional plane III, the mode $M_1$ being delayed by $\tau10$ and the mode $M_2$ by $\tau20$. The difference in time delay $\Delta\tau$ between the modes $M_1$ and $M_2$ is now greater than the coherence period $t(c)$ of the laser 1. Now no interference can occur between the two modes $M_1$ and $M_2$, as the light aves in the modes 1 and 2 are now incoherent with respect to each other. No modal noise will now be produced in the sectional plane III. This means that, if there are no incorrect couplings for $\Delta\tau<t(c)$ (that is, if the coupling in the region of the sectional plane II were correct), no modal noise will be produced at all. Coherence length is here understood to mean the path length between the laser and a sectional plane where it holds that $\Delta\tau=t(c)$.

Returning to FIG. 1, since on the one hand modal noise can never occur in the monomode fiber 10, and on the other hand the length of the fiber 10 is longer than the coherence length of the laser 1, no modal noise can occur in the transmission fiber 13. The core diameter of the monomode fiber 10 is much smaller than the core diameter of the multimode transmission fiber 13. This is advantageous because the adjustment of the coupling between the fibers 10 and 13 in a direction perpendicular to the optical axis 11 is much less critical than for the case where fibers having equal core diameters are coupled, as schematically shown, for example, in FIG. 2. Moreover, the probability that the end face 18 will reflect light back to the laser 1 is so small that it may be neglected. The coupling efficiency of the multimode transmission fiber 13 to the monomode fiber 10 is very low. Thus any light reflected from the transmission fiber 13 will be attenuated to a very high degree by the monomode fiber 10, so that this reflected light can hardly influence the laser 1.

Figure 3:
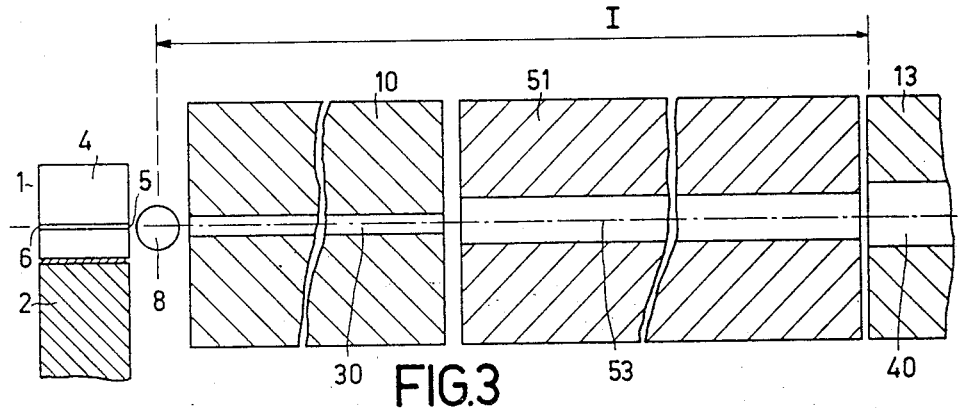
FIG. 3 is a schematic, cross-sectional view through another coupling path of a system according to the invention.

FIG. 3 shows how the coupling I from the system of FIG. 1 can be performed in an alternative manner. The coupling path is now formed by the series arrangement of the monomode fiber 10 and a multimode fiber 51. The core diameter 30 of the monomode fiber 10 is smaller than the core diameter 53 of the multimode fiber 51. The core diameter 40 of the transmission fiber 13 is larger than the core diameter 53 of the multimode fiber 51. The numerical aperture on the optical axis of the fiber 10 is smaller than the numerical aperture on the optical axis of the fiber 51. The numerical aperture on the optical axis of the fiber 51 is smaller than the numerical aperture of the optical axis of the transmission fiber 13. (A definition of the numerical aperture is given in, for example, Proceedings IEEE, Volume 66, July 1978, page 746).

The example of FIG. 3 shows the series arrangement of one monomode fiber and one multimode fiber. In practice, however, several lengths of multimode fiber will be used behind the monomode fiber. How long these lengths of fiber must be, is determined by reasons such as the places where a weld or a connection is desirable on installation or maintenance, the laser-to-rear of the rack distance the rear-of-rack to building junction distance, the distance between the junction and the first man-hole in the street, the junction-to-local office distance, etc. It is therefore mandatory to ensure that, at least for a path length which is approximately equal to the coherence length of the laser used, the lengths of fiber are of a structure in which the fiber cores and numerical apertures increase along the optical path from the light source to and including the transmission fiber.

The multimode fibers used may be of the graded-index type or of the step-index type. A combination of graded-index fibers and step-index fibers is alternatively possible. The fiber types are described, in, for example, Proceedings IEEE, Volume 66, July 1978, page 746. Since at each coupling the receiving fiber has a larger core and numerical aperture than the preceding fiber the probability that the varying specks are masked by a nonideal connection is low. In addition, the asymmetrical couplings have the advantage that the coupling efficiency in a backward direction is low, particularly the backwards coupling efficiency between the monomode fiber and the first graded-index fiber. So this coupling functions as the most important filter to keep unwanted, reflected light signals away from the laser diode.

What is claimed is:

1. An optical transmission system comprising:
   a semiconductor laser for generating light having a coherence length;
   a multimode transmission fiber; and
   a monomode fiber providing a coupling path for guiding light from the laser to the transmission fiber, said monomode fiber having a length greater than the coherence length of the laser light in the monomode fiber.

2. An optical transmission system comprising;
   a semiconductor laser for generating light having a coherence length;
   a multimode transmission fiber; and
   a coupling path for guiding light from the laser to the transmission fiber;
   characterized in that the coupling path comprises a serial arrangement of a monomode fiber and at least one multimode fiber on an optical axis, the numerical apertures on the optical axis and the core diameters of the fibers increasing from the laser to and including the transmission fiber.

3. A system as claimed in claim 2 characterized in that the length of the coupling path exceeds the coherence length of the laser light through the coupling path.

4. A system as claimed in claim 3 characterized in that the multimode fibers are graded index-type.

5. A system as claimed in claim 3 characterized in that the multimode fibers are step-index type.

6. A system as claimed in claim 3 characterized in that at least the first multimode fiber is a graded-index fiber, and the next multimode fiber is a step-index fiber.

* * * * *